J. Balmore,
Wrench.
N° 62,177.   Patented Feb. 19, 1867.
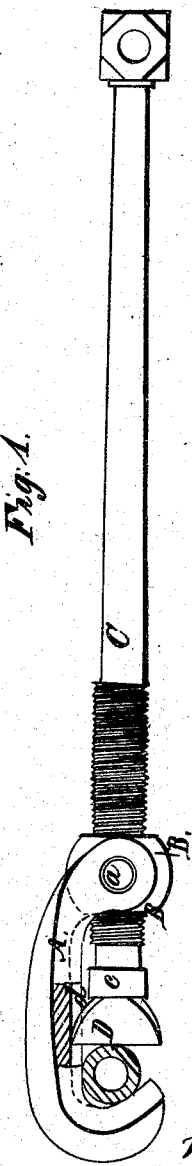
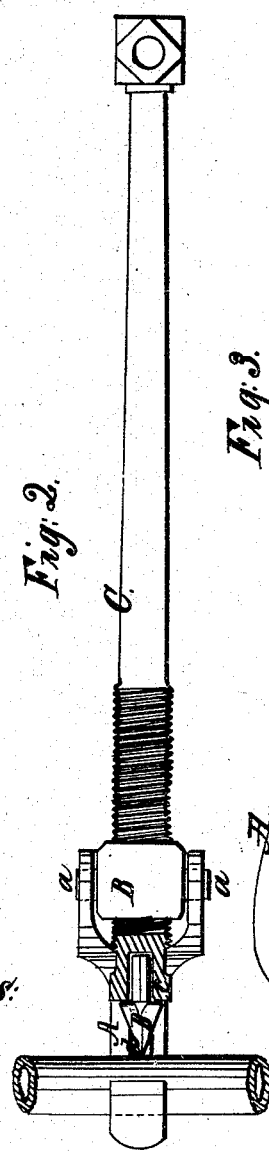
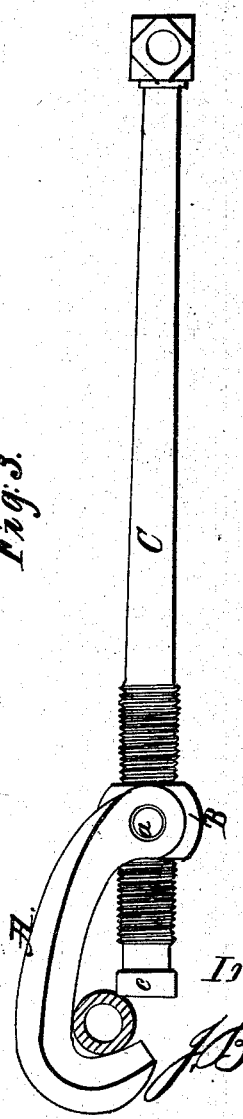
Witnesses:
Theo Fisch
Wm Truun
Inventor:
J. Balmore
Per Munn & Co
Attorneys

United States Patent Office.

JOHN BALMORE, OF NEW YORK, N. Y.

Letters Patent No. 62,177, dated February 19, 1867.

IMPROVED PIPE-CUTTER.

*The Schedule referred to in these Letters Patent and making part of the same.*

TO ALL WHOM IT MAY CONCERN:

Be it known that I, JOHN BALMORE, of Harlem, in the county of New York, and State of New York, have invented a new and improved Pipe-Tongs and Cutter; and I do hereby declare that the following is a full, clear, and exact description thereof, which will enable others skilled in the art to make and use the same, reference being had to the accompanying drawings, forming a part of this specification, in which—

Figure 1 represents a side elevation of this invention when the same is used as a cutter.

Figure 2 is a front elevation of the same.

Figure 3 is a side elevation of the same when used as tongs.

Similar letters of reference indicate like parts.

This invention relates to a tool which can be used with great advantage for screwing up and unscrewing pipes of any description, and also for cutting said pipes. It is provided with a swivel hook that catches over the pipe and is hung on gudgeons projecting from the ends of a nut into which the shank of the tool is tapped. The end of this shank forms a cup-shaped point, the edge of which bears against the pipe to be screwed or unscrewed. A hole bored in the centre of the cup-shaped point serves to receive the cutter, the edge of which drops into a groove in the inner surface of the hook, so that its cutting-edge can be set up against the pipe to be cut without turning the cutter.

A represents a hook make of steel, wrought iron, or any other suitable material, and of such a shape that the same will catch conveniently over the pipe to be acted on. Said hook swings on gudgeons, $a$, which project from the ends of a nut, B, that is tapped to receive the screw $b$ on the shank C, of the tool in such a manner that when the hook is attached to a pipe, the shank, together with the nut, can swing back and forth freely. That end of the shank C which projects through the nut B, terminates in a cup-shaped point, $c$, the edge of which is made to bear against the pipe when the same is to be screwed in or out, in the manner shown in fig. 3 of the drawing. The edge of the cup-shaped point is circular, and consequently the shank can be turned freely in either direction without throwing said edge off from the pipe, and the position of the point in relation to the pipe can be adjusted with ease and facility. By this arrangement I am enabled to use the same tongs for small and large pipes, and it is not necessary to keep or hand separate tongs for each size pipe. The cup-shaped end of the shank C is bored out to receive the cutter D. If this cutter is in position, its edge drops into the groove $d$ in the inner surface of the hook A, so that the shank C can be turned without turning the cutter. Said cutter can thus be set up against the pipe to be cut, and pipes of different sizes can be cut with ease and facility.

What I claim as new, and desire to secure by Letters Patent, is—

The cutter D, and groove $d$, in combination with the shank C, nut B, and hook A, constructed, arranged, and operating substantially as described and for the purposes set forth.

JOHN BALMORE.

Witnesses:
WM. F. McNAMARA,
W. HAUFF.